(12) United States Patent
Holmes et al.

(10) Patent No.: US 10,798,164 B2
(45) Date of Patent: Oct. 6, 2020

(54) TECHNIQUES FOR INTELLIGENT DEVICE COLLABORATION

(71) Applicant: Bose Corporation, Framingham, MA (US)

(72) Inventors: Ryan Terrill Holmes, Walnut Creek, CA (US); Ulf Schwekendiek, San Francisco, CA (US)

(73) Assignee: Bose Corporation, Framingham, MA (US)

( * ) Notice: Subject to any disclaimer, the term of this patent is extended or adjusted under 35 U.S.C. 154(b) by 72 days.

(21) Appl. No.: 15/835,191

(22) Filed: Dec. 7, 2017

(65) Prior Publication Data
US 2018/0176298 A1    Jun. 21, 2018

Related U.S. Application Data

(60) Provisional application No. 62/434,754, filed on Dec. 15, 2016.

(51) Int. Cl.
*G06F 15/16*    (2006.01)
*G06F 15/173*    (2006.01)
(Continued)

(52) U.S. Cl.
CPC .......... *H04L 67/1044* (2013.01); *G06F 16/40* (2019.01); *H04L 65/1069* (2013.01);
(Continued)

(58) Field of Classification Search
CPC ............................ H04L 67/12; G05B 19/4184
See application file for complete search history.

(56) References Cited

U.S. PATENT DOCUMENTS 6,353,174 B1 *   3/2002   Schmidt ............... G10H 1/0058
                                                    709/200
8,966,360 B2     2/2015   Phillips et al.
(Continued)

OTHER PUBLICATIONS

Detour / About; https://web.archive.org/web/20150321130627/https://www.detour.com/about. Captured from the Internet May 15, 2018.
(Continued)

*Primary Examiner* — Hieu T Hoang
(74) *Attorney, Agent, or Firm* — Bose Corporation

(57) ABSTRACT

Introduced here are computer-implemented techniques for facilitating communication between a central processing system and one or more computing devices. The central processing system can intelligently communicate with at least some of the computing device(s). Moreover, the central processing system can simultaneously or sequentially utilize sensor data generated by multiple computing devices that are known to be associated with one another. For example, if multiple computing devices are known to be in the same general geographical location, then the central processing system may only require that one computing device upload geographical metadata for analysis. If the computing device experiences any issues that prevent the geographical metadata from being uploaded, then the central processing system can automatically prompt another computing device to temporarily or permanently assume the role of leader.

25 Claims, 8 Drawing Sheets

(51) Int. Cl.
*H04L 29/08* (2006.01)
*G06F 16/40* (2019.01)
*H04L 29/06* (2006.01)
*H04W 4/80* (2018.01)
*G05B 19/418* (2006.01)

(52) U.S. Cl.
CPC ............ *H04L 65/605* (2013.01); *H04L 65/80* (2013.01); *G05B 19/4184* (2013.01); *H04L 67/12* (2013.01); *H04L 67/18* (2013.01); *H04W 4/80* (2018.02)

(56) References Cited

U.S. PATENT DOCUMENTS

| | | | |
|---|---|---|---|
| 2003/0120826 A1* | 6/2003 | Shay | G08G 1/096716 719/316 |
| 2009/0070127 A1* | 3/2009 | Florkey | G06F 9/542 705/319 |
| 2016/0286566 A1* | 9/2016 | Itaya | H04W 72/10 |
| 2018/0316764 A1* | 11/2018 | Ferreira Gomes | H04W 4/38 |

OTHER PUBLICATIONS

Detour /Location-Aware Audio Tours; https://web.archive.org/web/20150315081217/https://www.detour.com/. Captured from the Internet Mar. 15, 2018.
TechCrunch; Detour, Andrew Mason's Audio Tour App, Goes Global and Expands to 6 More Cities; https://techcrunch.com/2015/06/11/detour-andrew-masons-audio-tour-app-goes-global-and-expands-to-6-more-cities/.Ingrid Lunden, posted Jun. 11, 2015. Captured from the Internet Feb. 22, 2018.

\* cited by examiner

500

501

Receive an indication from one or more computing devices that a group has been formed

502

Receive metadata from one or more computing devices

503

Examine the metadata uploaded by the computing device(s)

504

Transmit an instruction to one or more computing devices to impose a consistent global state across the group

FIG. 5

TECHNIQUES FOR INTELLIGENT DEVICE COLLABORATION

CROSS-REFERENCE TO RELATED APPLICATIONS

This application claims the benefit of U.S. Provisional Patent Application No. 62/434,754, titled "Techniques for Intelligent Device Collaboration" and filed on Dec. 15, 2016, which is incorporated by reference herein in its entirety.

FIELD OF THE INVENTION

At least one embodiment of the present disclosure pertains to computer-implemented techniques for facilitating efficient communication between multiple computing devices.

BACKGROUND

A computer network (also referred to as a "data network") is a digital telecommunications network through which computing devices share resources. Networked computing devices exchange data with one another via a data link, which is a connection for transmitting and/or receiving digital information. Data links can be established using wired media (also referred to as "cable media") or wireless media. Data links can be established across different types of computer networks, including the Internet, wide area networks (WANs), local area networks (LANs), personal area networks (PANs), etc.

Computing devices that originate, route, or terminate data can be called network nodes. Nodes can include hosts such as mobile phones, computer servers, and networking hardware. Two computing devices can be said to be networked together when one computing device is able to exchange information with the other computing device, regardless of whether there is a direct connection between the two computing devices.

In computer networking, the transport layer is a conceptual division in the layered architecture of protocols in the network stack in the Internet Protocol (IP) Suite and the Open Systems Interconnection (OSI). The protocols of the transport layer facilitate host-to-host communication services for software programs. For example, the protocols of the transport layer may provide services such as data stream support, reliability, flow control, and multiplexing.

Computer networks that include multiple networked computing devices often utilize services provided by the transport layer to communicate with a central processing system (e.g., a computer server). However, conventional transport layer protocols fail to take advantage of the abilities of each networked computing device that resides within the computer network. Consequently, these multi-node computer networks do not fully utilize the shared resources accessible to each networked computing device.

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

FIG. 5 depicts a flow diagram of a process for imposing a consistent state across a group of computing devices.

Figure 1A:
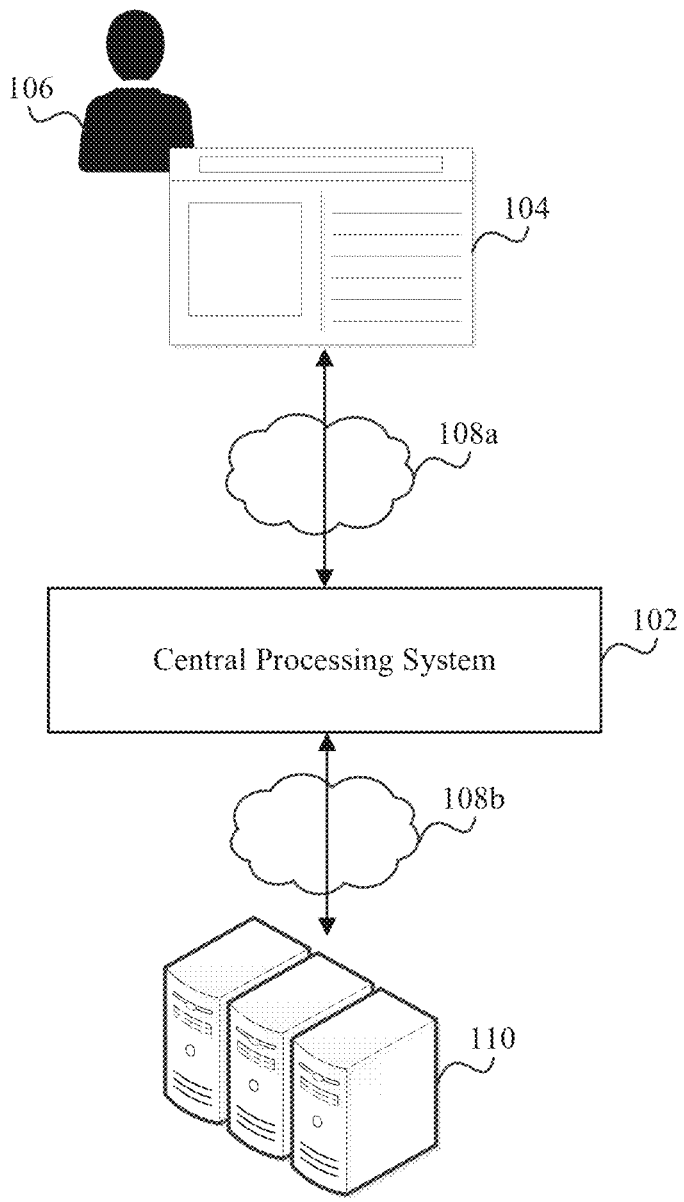
FIG. 1A illustrates a network environment that includes a central processing system responsible for facilitating communication between different computing devices.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Introduced here are computer-implemented techniques for facilitating communication between a central processing system and one or more computing devices. The central processing system can intelligently communicate with at least some of the computing device(s).

More specifically, various embodiments pertain to a central processing system able to intelligently manage a group of multiple computing devices on which corresponding consumers consume media content. The central processing system can be embodied as a network-accessible computer server or a software program executing on a specified computing device of the multiple computing devices. For example, the central processing system could be embodied as a web browser, desktop application, mobile application, or over-the-top (OTT) application. The specified computing device may be referred to as the "host" or "leader" of the group.

The central processing system can sync at least some of the computing devices by communicatively coupling the computing devices to one another over one or more network connections. These network connection(s) can be established using either wired media or wireless media. These network connection(s) may be establishing across different types of networks, including the Internet, wide area networks (WANs), local area networks (LANs), personal area networks (PANs), etc. Moreover, these network connection(s) may be established in accordance with various protocols, including the Bluetooth protocol, Near Field Communication (NFC) protocol, infrared protocol, etc.

Oftentimes, the central processing system will pair computing devices over multiple communication channels to improve reliability, protect against dropped connections, guard against instances of bandwidth congestion, etc. For example, the central processing system may cause a pair of computing devices to be communicatively coupled over a first communication channel established in accordance with a short-range communication protocol (e.g., Bluetooth® or NFC) and a second communication channel established in accordance with a long-range communication protocol (e.g., WiFi or a cellular protocol). Generally, the pair of computing devices will communicate directly with one another via the first communication channel, and the central processing system will act as an intermediary that is accessible to each computing device via the second communication channel.

In some embodiments, information is simultaneously sent over each of the multiple communication channels using, for example, a simple messaging service. In other embodiments, some information is sent over one channel and other information is sent over another channel. For example, geographical metadata indicative of current location may be continually uploaded to the central processing system via an internet communication channel and media metadata indicative of current runtime of a media file may be continually uploaded to other computing device(s) via a Bluetooth communication channel.

Embodiments of the technology are described in the context of certain communication protocols or networks for the purpose of illustration. Those skilled in the art will recognize that various communication protocols (e.g., Hypertext Transfer Protocol (HTTP), Institute of Electrical and Electronic Engineers (IEEE) 802.11, or different digital cellular standards) and networks (e.g., the Internet, LANs, PANs, or cellular networks) could be used.

Some embodiments of the technology employ a peer-to-peer communication framework with a strong leadership model. In such embodiments, a single computing device may be responsible for communicating with the central processing system. Other embodiments of the technology employ a peer-to-peer communication framework with a leaderless model. In such embodiments, each computing device included in a group may be able to communicate with the central processing system. Together, these frameworks and models allow the central processing system to impose a known state among multiple computing devices. For example, the central processing system may ensure a group of computing devices present media content substantially simultaneously. Examples of media content include tours, television programs, radio programs, podcasts, lessons, advertisements, video games, etc.

The central processing system may communicate with a computing device through a software program that is executed by the operating system of the computing device. Generally, the software program is designed for execution by a specific operating system, such as Microsoft Windows®, Apple macOS®, Apple iOS, Linux® (and its variants), Google Android®, etc. While certain embodiments may be described in the context of a certain type of software program, those skilled in the art will recognize that the features are equally applicable to other types of software programs.

The software program could be downloaded by the computing device from a network-accessible environment (e.g., a digital distribution platform accessible via a website or application store). Moreover, the software program may be configured to automatically launch in response to determining the computing device has come within a specified proximity of a certain geographical location or another computing device. For example, previously-purchased location-based media content could be automatically downloaded by a computing device upon determining that the computing device has come within a specified proximity of another computing device that includes the location-based media content.

Terminology

References in the present disclosure to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling, either direct or indirect, between two or more elements. The coupling/connection can be physical, logical, or a combination thereof. For example, two devices may be electrically and/or communicatively coupled to one another.

When used in reference to a list of multiple items, the word "or" is intended to cover all of the following interpretations: any of the items in the list, all of the items in the list, and any combination of items in the list. Meanwhile, if the present disclosure states that a feature "may," "can," "could," or "might" be included or have a characteristic, that particular feature is not required and need not necessarily have the characteristic.

The term "module" refers broadly to software, hardware, and/or firmware components. Modules are typically functional components that generate useful data and/or other output(s) based on specified input(s). A software program may include one or more modules, or a module may include one or more software programs.

System Topology Overview

FIG. 1A illustrates a network environment 100a that includes a central processing system 102 responsible for facilitating communication between different computing devices. Here, for example, the central processing system 102 is communicatively coupled to an computing device associated with an end user 106. The computing device may be configured to execute a software program capable of creating interface(s) through which the end user 106 can consume media content. Examples of media content include audio-based content (e.g., radio segments, podcasts, and tours) and video-based content (e.g., television programs and presentations). The end user 106 (who may also be referred to as a "consumer" of media content) can interact with the central processing system 102 via a network-accessible interface 104.

As noted above, the central processing system 102 may reside in a network environment 100a. Thus, the central processing system 102 can be connected to one or more computer networks 108a-b, which may include the Internet, cellular networks, wide area networks (WANs), local area networks (LANs), personal area networks (PANs), etc. Other wired communication channels or wireless communication channels could also be used. For example, the computing device on which the end user 106 accesses the network-accessible interface 104 may be communicatively coupled to one or more other computing devices on which other end users consume media content.

Media content could reside on the computing device used to access the network-accessible interface 104, the central processing system 102, one or more content servers 110 accessible to the central processing system 102, or any combination thereof. Thus, media content could be hosted locally and/or remotely.

Some embodiments of the central processing system 102 are hosted locally. That is, the central processing system 102 may reside on the computing device on which media content is consumed. For example, the central processing system 102 may be embodied as a mobile application through which the end user 106 consumes media content. Other embodiments of the central processing system 102 are executed by a cloud computing service operated by Amazon Web Services® (AWS), Google Cloud Platform™, Microsoft Azure®, or a similar technology. In such embodiments, the central processing system 102 may reside on a computer server (also referred to as a "host server") that is communicatively coupled to one or more other computer servers 110 (also referred to as "content servers"). The content server(s) 110 can include media content associated with different experiences, end user information (e.g., user profiles, login credentials, registration details), computing device information (e.g., unique identifiers, communication capabilities, available sensors), and other assets.

While certain embodiments are described in the context of network-accessible interfaces, those skilled in the art will recognize that the interfaces need not necessarily be accessible via a network. For example, a computing device associated with the end user 106 may be configured to execute a self-contained software program (e.g., a desktop application) that does not require network access. Instead, the self-contained software program may cause all necessary assets (e.g., instruction sets and media content) to be downloaded at a single point in time or on a periodic basis (e.g., daily, weekly, or monthly).

Figure 1B:
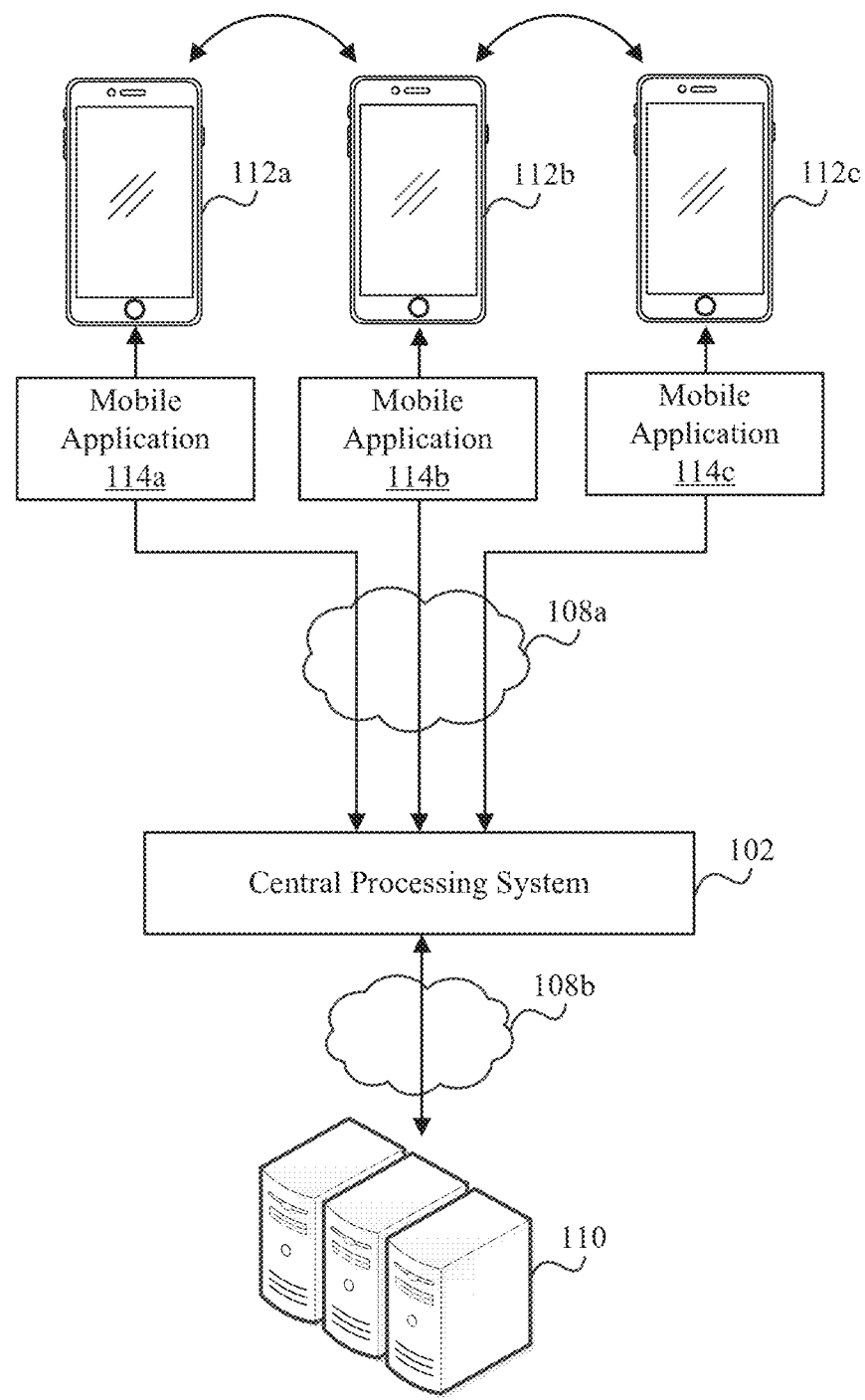
FIG. 1B depicts a network environment that includes a central processing system that intelligently communicates with multiple computing devices, which together form a group of computing devices.

FIG. 1B depicts a network environment 100b that includes a central processing system 102 that intelligently communicates with multiple computing devices 112a-c, which together form a group of computing devices. The group of computing devices can be communicatively coupled to one another via one or more network connections.

Computing devices could be communicatively coupled using an offline communication channel and/or an online communication channel. Examples of offline communication channels include those established in accordance with the Bluetooth protocol, NFC protocol, infrared protocol, radio-frequency identification (RFID) protocol, proprietary point-to-point protocols, etc. Examples of online communication channels include those established in accordance with HTTP, IEEE 802.11, and different digital cellular standards. Thus, two computing devices could be paired with one another via a Bluetooth communication channel and through the central processing system 102 via an internet communication channel. Various embodiments pertain to offline, peer-to-peer data communication techniques with an online fallback option.

Information can be transmitted by the computing devices 112a-c over any combination of these communication channels using, for example, a simple messaging service. For example, a first computing device could simultaneously send the same information directly to a second computing device over a Bluetooth communication channel and indirectly to the second computing device over an internet communication channel. Alternatively, a secondary communication channel (e.g., the internet communication channel) may only be invoked when the primary communication channel (e.g., the Bluetooth communication channel) fails. If the primary communication channel fails, then the computing device has the ability to fall back to a different transport layer for more reliability in application-level messaging.

As further described below, some embodiments described herein employ protocols that support peer-to-peer communication with a strong leadership model. Together, these protocols allow the central processing system 102 to communicate, either directly or indirectly, with all of the computing devices 112a-c within the group. Such communication permits the central processing system 102 to controllably impose a known state among some or all of the computing devices 112a-c. For example, the central processing system 102 may cause multiple computing devices to present location-based media content substantially simultaneously.

In some embodiments, the operating system of each computing device 112a-c executes a software program associated with the central processing system 102. Here, for example, each computing device 112a-c executes a mobile application 114a-c that is supported by the central processing system 102. The mobile applications 114a-c can facilitate secure communication between the computing devices 112a-c and the central processing system 102. Moreover, the mobile applications 114a-c may allow end users to readily acquire/consume media content. Example of media content include television programs, radio programs, podcasts, audio tours (e.g., guided tours of a city, building, park, campus, etc.), advertisements, video games, etc. The techniques introduced here are often useful to ensure that a group of multiple consumers consumes location-based media content at roughly the same time. However, similar techniques are equally applicable to media content that is not location based.

In response to receiving an indication of a request to initiate a content-based experience from a computing device, the central processing system 102 may retrieve media content from one or more databases and transmit the media content to the computing device across a network. Possible networks include PANs, LANs, WANs, cellular networks, and the Internet. Other wireless communication channels (e.g., NFC, Bluetooth®, or infrared) could also be used for local communication between computing devices within a specified proximity of one another.

Although FIG. 1B depicts the computing devices 112a-c as mobile phones, the techniques described herein can be used with any network-accessible computing device, such as desktop computers, tablet computers, personal digital assistants (PDAs), game consoles (e.g., Sony PlayStation® or Microsoft Xbox®), music players (e.g., Apple iPod Touch®), mobile gaming devices (e.g., Sony PSP® or Nintendo 3DS®)), music players (e.g., Apple iPod Touch®), wearable electronic devices (e.g., watches or fitness trackers), network-connected ("smart") devices (e.g., televisions or home assistant devices), virtual/augmented reality systems (e.g., head-mounted displays such as the Oculus Rift® or the Microsoft Hololens®), etc.

Figure 2:
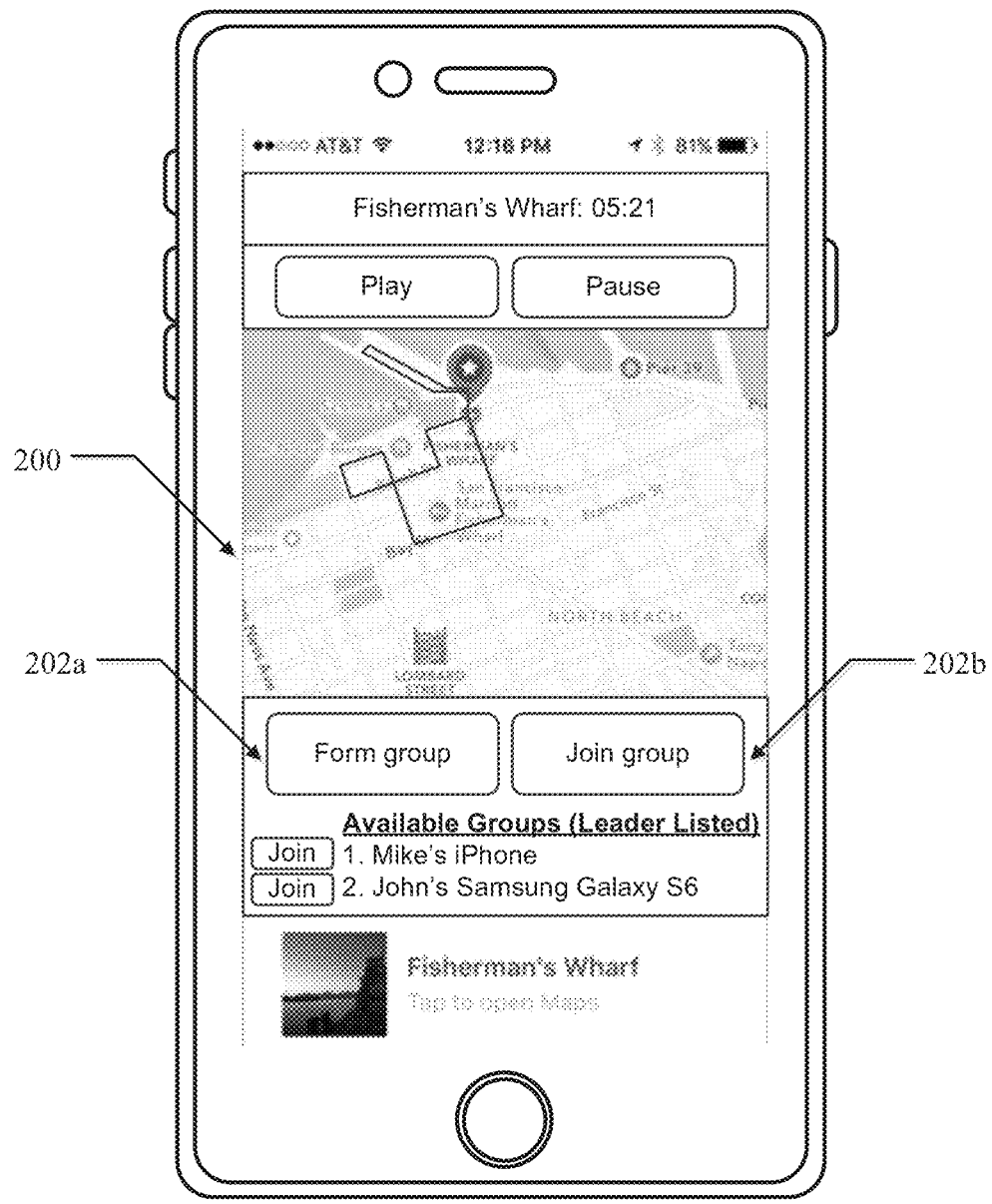
FIG. 2 depicts an interface that allows an end user to form or join a group of other end users.

FIG. 2 depicts an interface 200 that allows an end user to form or join a group of other end users. Here, the interface 200 is generated by a mobile application executing on a mobile phone. However, similar interfaces could be generated by other types of software programs, such as web browsers, desktop applications, and OTT applications. Some of the interfaces described herein are accessible via multiple types of software programs.

When the end user initiates the mobile application, the end user can select and/or initiate a content-based experience. Such action may cause a window to be shown that includes graphical buttons 202a-b for forming/joining a group of other end users who are interested in consuming the same media content. Here, for example, the interface 200 includes a graphical button 202a for forming a new group and a graphical button 202b for joining an existing group. In some embodiments, the mobile application may identify other mobile phone(s) located within a specified proximity of the mobile phone on which the end user views the interface 200. The mobile application may also post an identifier associated with each of these mobile phones to the interface 200 for review by the end user. The identifiers may include computer-generated identifiers (e.g., compilations of user name and device type), human-generated identifiers (e.g., those assigned by the corresponding end user), mobile identification number (MIN), mobile subscription identification number (MSIN), etc. Here, for example, two identifiers (i.e., Mike's iPhone and John's Samsung Galaxy S6) are shown on the interface 200.

When the end user makes a selection (e.g., by tapping the screen of the mobile phone), input indicative of the selection can be examined by the mobile application. In some embodiments, the mobile application forwards the input or metadata indicative of the input to the central processing system for further review.

Upon receiving an indication that the end user would like to form/join a group, the central processing system can sync the mobile phone with the computing device(s) associated with the other group member(s). Syncing the computing devices may enable members of the group to consume media content substantially simultaneously. This may be particularly valuable for content-based experiences that include location-based media content.

The central processing system can directly couple the mobile phone to at least one other computing device over one or more network connections. For example, the mobile phone may be directly coupled to another computing device over a Bluetooth communication channel. Moreover, the central processing system can indirectly couple the mobile phone to at least one other computing device. For example, the mobile phone may be indirectly coupled to another computing device over an internet communication channel via the central processing system. Additionally or alternatively, the mobile application executing on the mobile phone may be responsible for performing such actions. That is, the mobile application may locally sync the computing devices corresponding to the group members without communicating with the central processing system.

Figure 3A:
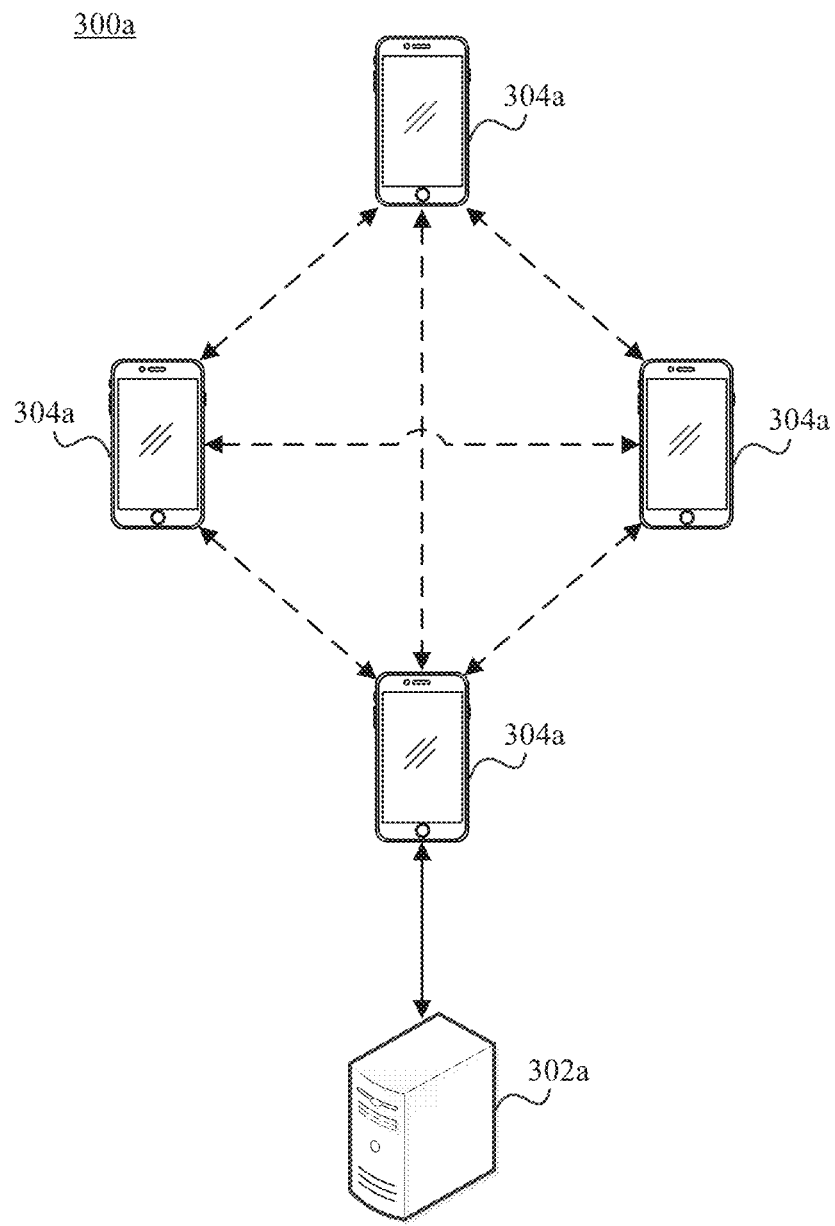
FIG. 3A depicts an example of a communication network that includes a central processing system and multiple computing devices that are synced to one another.
Figure 3B:
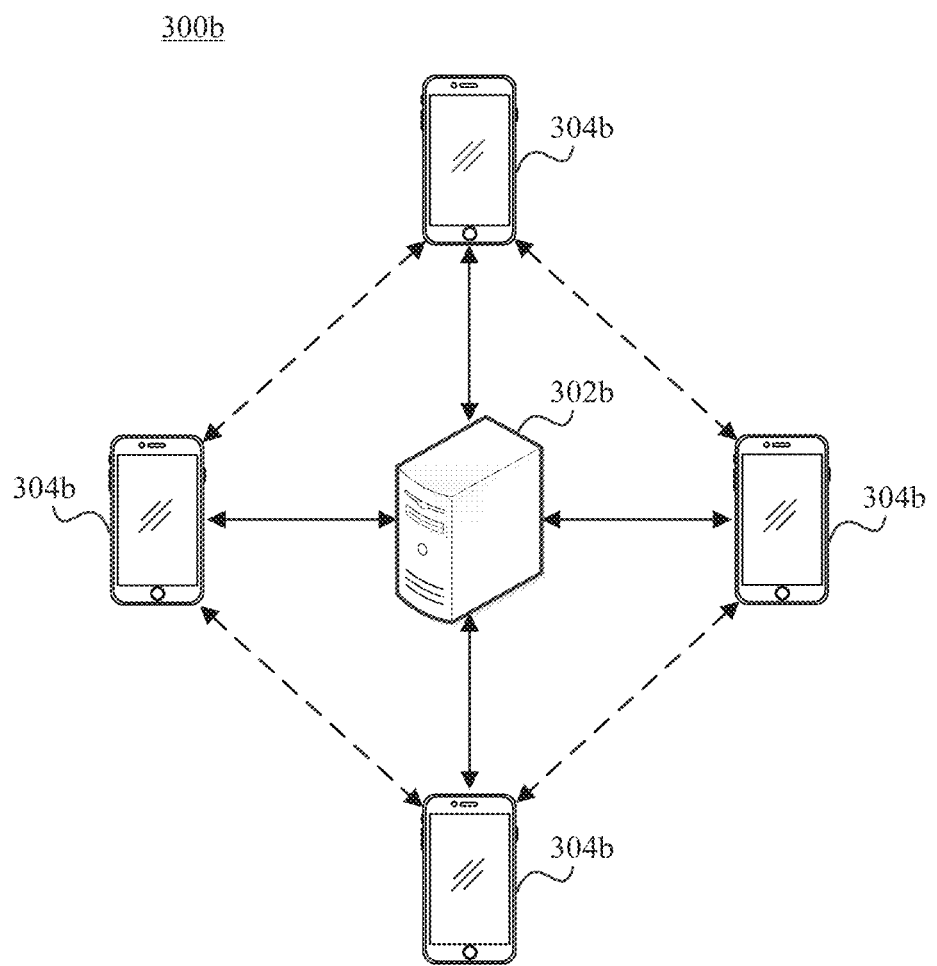
FIG. 3B depicts another example of a communication network that includes a central processing system and multiple computing devices that are synced to one another.

FIGS. 3A-B depict examples of communication networks 300a-b that include a central processing system 302a-b and multiple computing devices 304a-b that are synced to one another. Those skilled in the art will recognize that other configurations are possible. For example, some computing devices may be coupled to the central processing system 302a-b and at least one other computing device, while other computing devices may only be coupled to at least one other computing device.

Some or all of the computing devices 304a-b can be connected to one another via an offline communication channel, as shown by a dashed line. Examples of offline communication channels include those established in accordance with the Bluetooth protocol, NFC protocol, infrared protocol, etc. In some embodiments, each computing device is connected to all other computing devices within the communication network, thereby forming a fault-tolerant mesh communication network. The mesh communication network may utilize peer-to-peer frequency-hopping techniques, which are particularly valuable when using inconsistent communication channels such as Bluetooth®.

Alternatively, each computing device within the communication network may only be connected to some subset of the computing devices included in the group. For example, each computing device may only be connected to a specified computing device (also referred to as the "host" or "leader" of the group) that is responsible for communicating with the central processing system 302a-b. Thus, some or all of the computing devices 304a-b can be connected to the central processing system 302a-b via an online communication channel, as shown by a solid line. Examples of online communication channels include those established in accordance with HTTP, IEEE 802.11, and different digital cellular standards.

Peer-to-peer messaging may be employed by the computing devices 304a-b if the communication network includes strong leadership data distribution guarantees. For example, small metadata messages could be sent to the central processing system 304a-b for review as part of a simple messaging service. The computing devices 304a-b could send data to a leader computing device as shown in FIG. 3A or directly to the central processing system as shown in FIG. 3B. The data may include metadata specifying geographical metadata specifying the geographical location of the corresponding computing device and/or media metadata specifying runtime, frame, segment, etc., of the corresponding computing device. The geographical location may be represented using Global Positioning (GPS) coordinates, wireless access point (WAP) identifiers (e.g., a WiFi router identifier), etc. Different types of metadata can be transmitted over the communication channels. For example, a computing device may transmit geographical metadata to a central processing system via an online communication channel and media metadata to another computing device via an offline communication channel, or vice versa.

The central processing system 302a-b may sync the media content that is presented by the computing devices 304a-b based on the data received from the computing devices 304a-b, either directly or indirectly through a leader computing device. However, because each computing device 304a-b generally includes a full copy of the media content, the central processing system 302a-b need not necessarily sync the media content itself. Instead, messages broadcast between the computing devices 304a-b and/or from the computing devices 304a-b to the central processing system 302a-b may specify certain characteristics of the media content. Such characteristics can include the runtime, frame, or segment, as well as the current geographical location of the corresponding computing device. These messages can be viewed as abstract representations of the current state of a given computing device. The messages may be easily transmitted to another computing device (e.g., via an offline network connection) and the central processing system (e.g., via an online network connection). The central processing system 302a-b may be able to ensure a consistent global state across all of the computing devices 304a-b by reviewing the metadata corresponding to each computing device.

As shown in FIG. 3A, some embodiments require that a specified computing device (also referred to as the "host" or "leader" of the group) be responsible for communicating with the central processing system. Generally, the leader computing device remains communicatively coupled to the central processing system via an online communication channel while the other computing devices communicate with one another via offline communication channels. The leader computing device could also trigger certain events based on the messages received from the other computing devices. For example, the leader computing device may send a message that prompts another computing device to play or pause media content based on the current geographical location of the other computing device.

A leaderless model may also be employed by the computing devices in which the central processing system intelligently determines which computing device to communicate with. For example, the central processing system may request information (e.g., a status update) from each computing device that comes within a specified proximity of a geographical location defined by a GPS coordinate, WAP identifier, etc. The central processing system may elect to communicate with the first computing device that provides the requested information.

Different computing devices within a group could hold the position of leader over time. The central processing system may determine which computing device should be the leader based on various factors. For example, the central processing system could request another computing device assume the role of leader upon determining the battery of the leader computing device has fallen below a specified charge level, the leader computing device is unable to maintain a stable network connection, the leader computing device has begun consuming more than a specified amount of processing resources, etc.

Accordingly, the group of computing devices can share a processing load by outsourcing the gathering of sensor data and/or the reporting of the sensor data to the central processing system. Said another way, resource utilization (e.g., of battery power, network bandwidth, or processing resources) can be optimized by allowing the computing devices within a group to intelligently collaborate with one another. Such a technique may be summarized as allowing the computing devices to "draft off of one another." For example, a first computing device may discontinue uploading GPS measurements when the battery falls below a specified charge level and a second computing device having a higher charge level may begin uploading GPS measurements that are subsequently examined by the central processing system. Other computing device(s) may send the first computing device that is no longer acquiring sensor data prompts/triggers based upon the knowledge that the computing devices in the group are in close proximity to one another. Thus, the state of the first computing device can be deduced based on the state of other computing device(s) in the group. Similar techniques can be applied to any sensors that are housed by the computing devices in the group, which are collectively viewed as a cluster of sensors by the central processing system.

Figure 4:
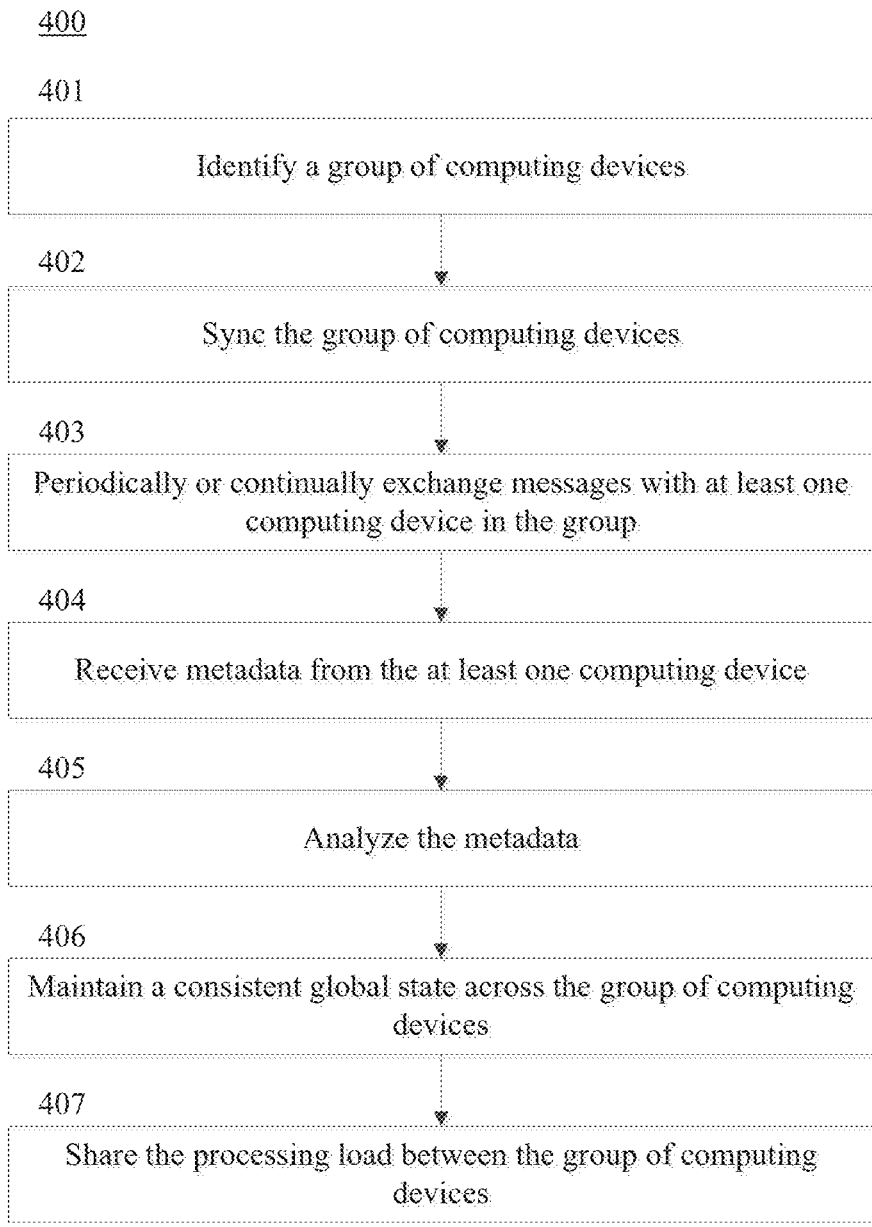
FIG. 4 depicts a flow diagram of a process for managing a group of computing devices.

FIG. 4 depicts a flow diagram of a process 400 for managing a group of computing devices. Initially, a central processing system can identify the group of computing devices (step 401). The group of computing devices could be identified based on input received at the central processing system that is indicative of user input received at each computing device. For example, each computing device could execute a software program that generates an interface through which the corresponding end user can submit a request to form a new group or join an existing group.

The central processing system can then sync the group of computing devices (step 402). Syncing can be done via an offline communication channel directly between a pair of computing devices or an online communication channel through the central processing system. Oftentimes, a computing device will be synced to one another computing device over multiple communication channels so that the data link is as robust as possible. For example, a computing device may simultaneously transmit identical messages to another computing device via an offline communication channel (e.g., established over Bluetooth®) and an online communication channel (e.g., established over the Internet).

The central processing system can periodically or continually exchange messages with at least one computing device in the group (step 403). For example, in some embodiments the central processing system communicates with all of the computing devices in the group, while in other embodiments the central processing system only communicates with a leader computing device (which may relay incoming communications to other computing devices in the group). The central processing system may receive metadata from the at least one computing device (step 404). The metadata could be received in accordance with a simple messaging service. The metadata may include location metadata, content metadata, etc. The metadata received by the central processing system may be generated by some or all of the computing devices in the group.

The central processing system then analyzes the metadata (step 405). More specifically, the central processing system can parse the metadata to extract characteristics of the computing devices in the group. For example, the central processing system may determine the geographical location of each computing device by extracting GPS coordinates from the metadata. If geographical location can only be established for a subset of the computing devices in the group, then the central processing system may impute a geographical location to the other computing devices based on the knowledge that all of the computing devices are likely in close proximity to one another. As another example, the central processing system may acquire sensor information generated by one or more of the computing devices.

The central processing system can maintain a consistent global state across the group of computing devices based on the metadata (step 406). For example, the central processing system may cause a software program executed by each computing device to present the same media content to maintain consistency in runtime. As another example, the central processing system may cause the software program executed by each computing device to present the media content with different delays to account for differences in geographical location.

In some embodiments, the central processing system also shares the processing load between the group of computing devices based on the metadata (step 407). For example, the central processing system may only require one computing device in the group monitor geographical at any point in time. This can be accomplished by uploading a GPS coordinate, WAP identifier, etc., that is attributed to the entire group. However, the central processing system may intelligently switch between the computing devices when an event occurs that prohibits the computing device from specifying its geographical location. Examples of such events include a battery level dropping below a specified threshold, a network connection becoming unavailable, etc. Moreover, the group of computing devices may be able to collaboratively record data based on any sensors that are included in the computing devices. For example, a first computing device may be configured to upload a first type of data (e.g., geographical metadata), while a second computing device may be configured to upload a second type of data (e.g., content metadata). This may be done to ensure that battery/sensor usage is consistent across the group.

FIG. 5 depicts a flow diagram of a process 500 for imposing a consistent state across a group of computing devices. Initially, a central processing system can receive an indication from one or more computing devices that a group has been formed (step 501). Generally, each computing device in the group transmits a message to the central processing system indicating that specifies the corresponding end user desires to join the group. However, a single computing device may transmit a message to the central processing system on behalf of the other computing device(s) in the group. In such embodiments, the message may identify the computing devices in the group using, for example, unique identifiers.

The central processing system can receive metadata from one or more computing devices in the group (step 502). In some embodiments the computing devices in the group transmit metadata directly to the central processing system, while in other embodiments the computing devices in the group transmit metadata to a specified computing device responsible for forwarding at least some of the metadata to the central processing system. The metadata can include geographical metadata indicative of current location, media metadata indicative of current runtime of a media file, or any combination thereof.

The central processing system can then examine the metadata uploaded by the computing device(s) (step 503). For example, if the metadata includes geographical metadata, then the central processing system can identify a location of each computing device in the group. As another example, if the metadata includes media metadata, then the central processing system can identify a current runtime of each computing device in the group.

Based on an outcome of the examination of the metadata, the central processing system may transmit an instruction to one or more computing devices to impose a consistent global state across the group (step 504). For example, the central processing system may transmit a discrete instruction to each computing device. As another example, the central processing system may transmit a set of instruction(s) to the leader computing device, which forwards the instruction(s) to the appropriate computing device(s). The instructions may cause the entire group to experience media content at substantially the same time.

Unless contrary to physical possibility, it is envisioned that the steps described above may be performed in various sequences and combinations. For example, process 500 of FIG. 5 may be performed continually in real time or on a periodic basis (e.g., metadata may be uploaded every minute, two minutes, five minutes, etc.). Other steps could also be included in some embodiments.

Processing System

Figure 6:
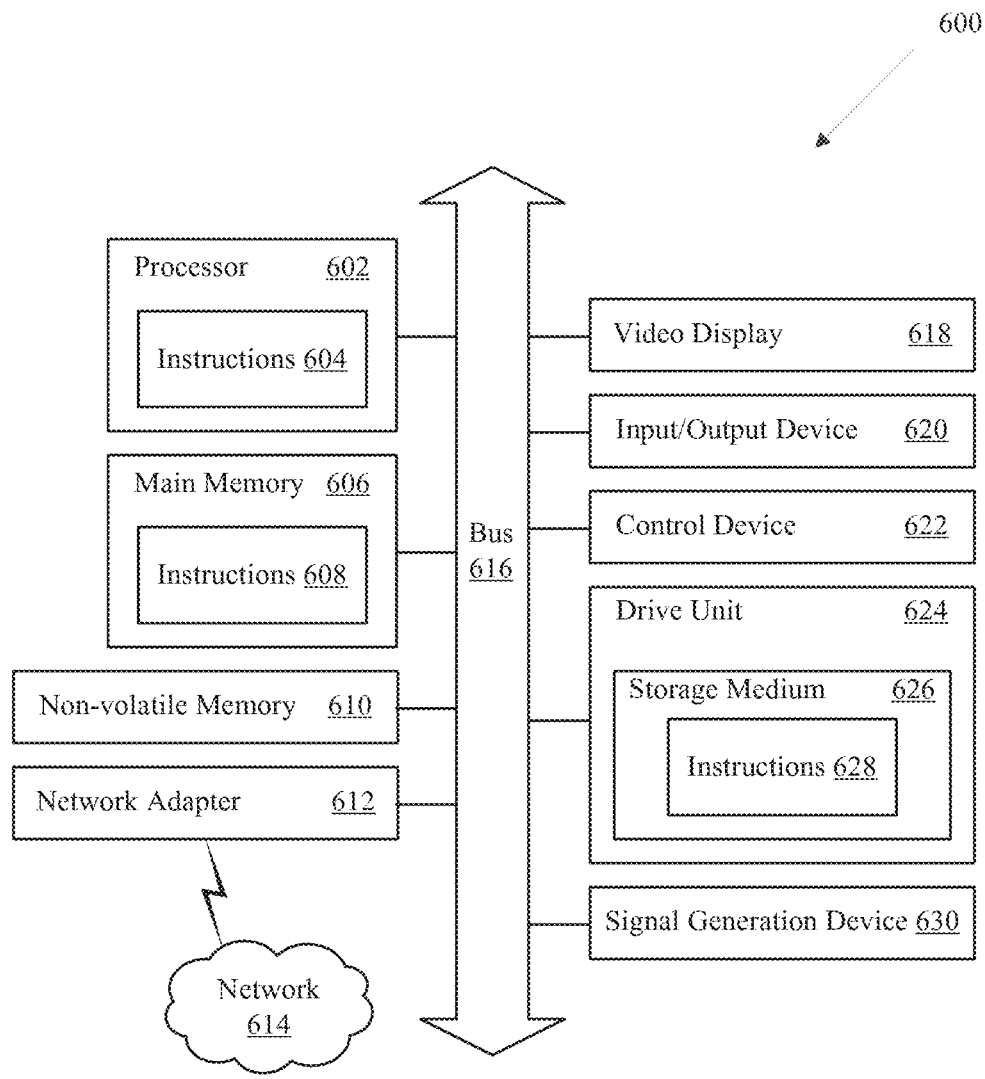
FIG. 6 is a block diagram illustrating an example of a processing system in which at least some operations described herein can be implemented.

FIG. 6 is a block diagram illustrating an example of a processing system 600 in which at least some operations described herein can be implemented. For example, some components of the processing system 600 may be hosted on a computing device that includes a central processing system (e.g., central processing system 102 of FIGS. 1A-B).

The processing system 600 may include one or more central processing units ("processors") 602, main memory 606, non-volatile memory 610, network adapter 612 (e.g., network interface), video display 618, input/output devices 620, control device 622 (e.g., keyboard and pointing devices), drive unit 624 including a storage medium 626, and signal generation device 630 that are communicatively connected to a bus 616. The bus 616 is illustrated as an abstraction that represents one or more physical buses and/or point-to-point connections that are connected by appropriate bridges, adapters, or controllers. The bus 616, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 600 may share a similar computer processor architecture as that of a desktop computer, tablet computer, personal digital assistant (PDA), mobile phone, game console (e.g., Sony PlayStation® or Microsoft Xbox®), music player (e.g., Apple iPod Touch®), wearable electronic device (e.g., a watch or fitness tracker), network-connected ("smart") device (e.g., a television or home assistant device), virtual/augmented reality systems (e.g., a head-mounted display such as Oculus Rift® or Microsoft Hololens®), or another electronic device capable of executing a set of instructions (sequential or otherwise) that specify action(s) to be taken by the processing system 600.

While the main memory 606, non-volatile memory 610, and storage medium 626 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 628. The term "machine-readable medium" and "storage medium" shall also be taken to include any medium that is capable of storing, encoding, or carrying a set of instructions for execution by the processing system 600.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in a computing device. When read and executed by the one or more processors 602, the instruction(s) cause the processing system 600 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 610, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 612 enables the processing system 600 to mediate data in a network 614 with an entity that is external to the processing system 600 through any communication protocol supported by the processing system 600 and the external entity. The network adapter 612 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 612 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method for managing computing devices on which end users consume media content, the method comprising:
   receiving, from each computing device of multiple computing devices, input indicative of a request to be included in a group;
   coupling each computing device of the multiple computing devices to a processing system across a network communication channel;
   coupling each computing device of the multiple computing devices to at least one other computing device of the multiple computing devices across a second network communication channel,
   wherein each computing device transmits a first type of metadata over the network communication channel and a second type of metadata over the second communication channel; and
   transmitting an instruction to at least one computing device of the multiple computing devices to impose a consistent global state across the group,
      wherein the consistent global state causes the multiple computing devices to present media content to corresponding consumers substantially simultaneously.

2. The computer-implemented method of claim 1, wherein the network communication channel is established over the Internet or a cellular network.

3. The computer-implemented method of claim 1, wherein the second network communication channel is established in accordance with a Bluetooth protocol, a Near Field Communication (NFC) protocol, or an infrared protocol.

4. The computer-implemented method of claim 1, wherein the first type of metadata includes geographical metadata specifying a location of the corresponding computing device.

5. The computer-implemented method of claim 4, wherein the location is specified using a Global Positioning System (GPS) coordinate, a wireless access point (WAP) identifier, or any combination thereof.

6. The computer-implemented method of claim 4, wherein the instruction transmitted to the at least one computing device prompts the at least one computing device to initiate a specified portion of the media content, and wherein the specified portion of the media content is associated with the location.

7. The computer-implemented method of claim 1, wherein the second type of metadata includes media metadata specifying a runtime of the corresponding computing device.

8. A non-transitory computer-readable medium with instructions stored thereon that, when executed by a processor, perform operations comprising:
   identifying multiple computing devices that are to be communicatively coupled to one another to form a group;
   syncing the multiple computing devices, wherein said syncing comprises:
      initiating an online communication channel between each computing device of the multiple computing devices and a processing system; and
      initiating an offline communication channel between each computing device of the multiple computing devices and at least one other computing device of the multiple computing devices,
      wherein each computing device transmits a first type of metadata over the online communication channel and a second type of metadata over the offline communication channel;
   receiving, from at least one computing device of the multiple computing devices, a message that includes the first type of metadata;
   examining the first type of metadata included in each message; and transmitting an instruction to the at least one computing device of the multiple computing devices to impose a consistent global state across the group,
  wherein the consistent global state causes the multiple computing devices to present media content to corresponding consumers substantially simultaneously.

9. The non-transitory computer-readable medium of claim 8, wherein said receiving is performed on a periodic basis throughout the runtime of the media content.

10. The non-transitory computer-readable medium of claim 8, wherein the method further comprises:
  sharing a processing load across the multiple computing devices in response to detecting a change in state of the at least one computing device.

11. The non-transitory computer-readable medium of claim 10, wherein the at least one computing device represents a first subset of the multiple computing devices, and wherein said sharing comprises:
  causing a second subset of the multiple computing devices to transmit the message rather than the first subset of the multiple computing devices.

12. The non-transitory computer-readable medium of claim 10, wherein the change in state includes a battery falling below a specified charge level, an inability to maintain a stable network connection, a consumption level exceeding a specified amount of processing resources, or any combination thereof.

13. The non-transitory computer-readable medium of claim 8, wherein the online communication channel is established over the Internet or a cellular network, and wherein the offline communication channel is established in accordance with a Bluetooth protocol, a Near Field Communication (NFC) protocol, or an infrared protocol.

14. The non-transitory computer-readable medium of claim 8, wherein the metadata specifies a geographical location of the corresponding computing device, and wherein the media content includes location-based media content.

15. A computer-implemented method comprising:
  receiving, by a processing system from a software program executing on at least one computing device of multiple computing devices, input indicative of a request to be included in a group;
  initiating a first communication channel between each computing device of the multiple computing devices and the processing system; and
  initiating a second communication channel between each computing device of the multiple computing devices and at least one other computing device of the multiple computing devices,
    wherein each computing device transmits a first type of metadata over the communication channel and a second type of metadata over the second communication channel;
  identifying, by the processing system, a location of each computing device of the multiple computing devices based on the geographical metadata;
  identifying, by the processing system, a runtime of each computing device of the multiple computing devices; and
  transmitting, by the processing system, an instruction to the at least one computing device to impose a consistent global state across the group,
    wherein the consistent global state causes the multiple computing devices to present media content to corresponding consumers substantially simultaneously, and
    wherein the instruction is based on the location, the runtime, or any combination thereof.

16. The computer-implemented method of claim 15, wherein the at least one computing device includes all of the multiple computing devices.

17. The computer-implemented method of claim 15, wherein receipt of the instruction causes the at least one computing device to forward the instruction over the second communication channel to one or more other computing devices of the multiple computing devices that are not directly coupled to the processing system.

18. The computer-implemented method of claim 15, wherein the software program is a mobile application, a desktop application, a web browser, or an over-the-top (OTT) application.

19. A computer-implemented method for forming a fault-tolerant mesh communication network, the method comprising:
  receiving, from each computing device of multiple computing devices, input indicative of a request to form a group for the purpose of consuming media content together;
  for each computing device of the multiple computing devices,
    establishing a communication channel between a given computing device and each other computing device of the multiple computing devices over a network, thereby forming a fault-tolerant mesh communication network, and
    establishing a second communication channel between the given computing device and a central processing system across a second network,
    wherein each computing device transmits a first type of metadata over the communication channel and a second type of metadata over the second communication channel; and
  maintaining a consistent global state across the multiple computing devices,
    wherein the consistent global state causes the multiple computing devices to present the media content to corresponding consumers substantially simultaneously.

20. The computer-implemented method of claim 19, wherein each communication channel established over the network is established in accordance with a Bluetooth protocol.

21. The computer-implemented method of claim 19, wherein communications delivered over the network are in the form of a simple messaging service.

22. The computer-implemented method of claim 19, wherein each communication channel established over the second network is established in accordance with a wireless networking standard or a digital cellular networking standard.

23. The computer-implemented method of claim 19, wherein the first type of metadata is geographical metadata, and wherein the second type of metadata is media metadata.

24. The computer-implemented method of claim 19, wherein the first type of metadata is media metadata, and wherein the second type of metadata is geographical metadata.

25. The computer-implemented method of claim 19, further comprising:
  employing a peer-to-peer frequency-hopping technique to ensure against dropped connections over the network.

* * * * *